(12) United States Patent
Thomsen (10) Patent No.: US 10,066,606 B2
(45) Date of Patent: *Sep. 4, 2018

(54) STACKING WIND TURBINE BLADES FOR SEA TRANSPORT

(71) Applicant: Vestas Wind Systems A/S, Aarhus N. (DK)

(72) Inventor: Peter Frans Thomsen, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 88 days.

This patent is subject to a terminal disclaimer.

(21) Appl. No.: 15/300,406

(22) PCT Filed: Mar. 27, 2015

(86) PCT No.: PCT/DK2015/050070
§ 371 (c)(1),
(2) Date: Sep. 29, 2016

(87) PCT Pub. No.: WO2015/149809
PCT Pub. Date: Oct. 8, 2015

(65) Prior Publication Data
US 2017/0159646 A1    Jun. 8, 2017

(30) Foreign Application Priority Data
Mar. 31, 2014    (DK) .................................. 2014 70165

(51) Int. Cl.
*B60P 3/40*    (2006.01)
*F03D 13/40*    (2016.01)
*F03D 80/00*    (2016.01)

(52) U.S. Cl.
CPC ............. *F03D 13/40* (2016.05); *F03D 80/00* (2016.05)

(58) Field of Classification Search
CPC . B60P 3/40; F03D 1/005; F03D 13/40; Y02E 10/72
(Continued)

(56) References Cited

U.S. PATENT DOCUMENTS

| 2,032,721 A | * | 3/1936 | Schaefer | ................ B60G 5/053 267/44 |
| 8,177,462 B2 | * | 5/2012 | Riddell | ..................... B60P 3/40 410/31 |

(Continued)

FOREIGN PATENT DOCUMENTS

| CN | 102414093 | 4/2012 | |
| EP | 2206627 A2 | * 7/2010 | ................ B60P 7/12 |

(Continued)

OTHER PUBLICATIONS

European Patent Office, International Search Report and Written Opinion in PCT Application No. PCT/DK2015/050070, dated Jun. 25, 2015.

(Continued)

*Primary Examiner* — Hilary L Gutman
(74) *Attorney, Agent, or Firm* — Wood Herron & Evans LLP (57) ABSTRACT

The present invention relates to a method of stacking wind turbine blades for sea transport. An improved way of arranging blades for sea transport, where less structural framework is needed, would be advantageous. Structural framework not only causes additional cost, but also takes up additional time for arranging the blades for transport. The invention involves a method of stacking wind turbine generator blades for sea transportation, the method involving attaching a blade root support frame to a root flange of the blade, is supported by at least two legs located as at least one leg on each transverse side of a root end of the blade, and attaching a blade spanwise support frame to a spanwise portion of the (Continued)

blade, and where the spanwise support frame includes least two legs located as at least one leg on each transverse side of the blade, where the legs of the root support frame and the spanwise support frame extend both downwards and upwards and are adapted to have lengths downwards and upwards in order that at least two blades are stackable on top of each other, and wherein a stacking support structure for the blades consists of mainly the support frames, when the at least two blades are transported at sea.

10 Claims, 7 Drawing Sheets

(58) Field of Classification Search
USPC .......... 410/44, 45, 32–35, 53, 120; 280/404
See application file for complete search history.

(56) References Cited

U.S. PATENT DOCUMENTS

| | | | | |
|---|---|---|---|---|
| 8,226,342 B2* | 7/2012 | Nies | .......................... | B60P 3/40 414/350 |
| 8,602,700 B2 | 12/2013 | Johnson | | |
| 8,961,085 B2* | 2/2015 | Ressel | ....................... | B60P 3/40 410/44 |
| 9,199,570 B2* | 12/2015 | Pedersen | ................... | B60P 3/40 |
| 9,701,236 B2* | 7/2017 | Thomsen | ................... | B60P 3/40 |
| 9,874,235 B2* | 1/2018 | Van Der Zee | ............ | F16B 2/08 |
| 2007/0036627 A1* | 2/2007 | Wright | ................. | B25H 1/0007 410/49 |
| 2007/0177954 A1* | 8/2007 | Kootstra | ................... | B60P 3/40 410/44 |
| 2016/0221488 A1* | 8/2016 | Thomsen | ................... | B60P 3/40 |
| 2017/0253167 A1* | 9/2017 | Gill, III | ..................... | B60P 3/00 |
| 2017/0253169 A1* | 9/2017 | Keller | ........................ | B60P 3/40 |
| 2017/0370346 A1* | 12/2017 | Botwright | ............... | B63B 25/00 |

FOREIGN PATENT DOCUMENTS

| | | | | |
|---|---|---|---|---|
| EP | 2239459 A2 | 10/2010 | | |
| EP | 2487363 A1 | 8/2012 | | |
| EP | 2669506 A1 | 12/2013 | | |
| EP | 2669507 A1 * | 12/2013 | ............ | B65D 85/68 |
| EP | 2708731 A2 | 3/2014 | | |
| WO | 2010125424 A1 | 11/2010 | | |
| WO | 2012048719 A1 | 4/2012 | | |
| WO | 2015035997 A1 | 3/2015 | | |

OTHER PUBLICATIONS

Danish Patent and Trademark Office, Search Report in Application No. PA 2014 70165, dated Nov. 10, 2014.
The State Intellectual Property Office of China, Office Action in CN20150017697.6, dated Apr. 25, 2018.

* cited by examiner

STACKING WIND TURBINE BLADES FOR SEA TRANSPORT

TECHNICAL FIELD

The present invention relates to a method of stacking wind turbine blades for sea transport.

BACKGROUND

As the offshore wind turbine market is increasing, there is an increased demand for effective transport of blades at sea. This means that the blades must be arranged in way, which allows many blades to be arranged on a ship or barge, as the sailing from a harbour to a wind turbine installation site, and back, may be regarded as wasted time. One known way is described in U.S. Pat. No. 8,602,700, which shows a system of double frames, where inner frames alone is used for land transport and additional, outer frames along with the inner frames must be provided for stacking of blades for sea transport.

Hence, an improved way of arranging blades for sea transport, where less structural framework is needed would be advantageous. Structural framework not only causes additional cost, but also takes up additional time for arranging the blades for transport at the harbour as well as for installation of the blades at the installation site.

It is a further object of the present invention to provide an alternative to the known art. Further objectives appear from the description, claims and figures.

SUMMARY

Thus, the above described objects and several other objects are intended to be obtained in an aspect of the invention by providing a method of stacking wind turbine generator blades for sea transportation, the method involving attaching a blade root support frame to a root flange of the blade, where
  the root support frame includes a main support part, which is supported by at least two legs located as at least one leg on each transverse side of a root end of the blade, and
  an attachment part adapted for being attached to the root flange of the blade, and
attaching a blade spanwise support frame to a spanwise portion of the blade, where
  the spanwise support frame includes a cradle-like support part adapted to engage and support a spanwise surface part of the blade, and
  where the spanwise support frame is supported by at least two legs located as at least one leg on each transverse side of the blade,
where the legs of the root support frame and the spanwise support frame extend both downwards and upwards and are adapted to have lengths downwards and upwards in order that at least two blades are stackable on top of each other, and
wherein a stacking support structure for the blades consists of mainly the support frames, when the at least two blades are transported at sea.

As the stacking support structure mainly, or merely, consists of the support frames, the method provides a simplified arrangement of the blades for sea transport. Since the legs of the support frames are located at transverse sides of the blades, an increased distance between the legs is obtained, which provide a support structure with increased stability. The increased stability enables an omission of further framework for the transport.

The method may involve that any number of root support frames, spanwise support frames as well as blades are provided to facilitate a plurality of blades to be stacked on top of each other. This has as one result, that any desired or practical number of blades to be stacked vertically.

The method may also involve, that root support frames and spanwise support frames are attached to any root support frame and spanwise support frame supported by the root support frames and spanwise support frames, respectively. The support frames may be attached to deck by bolting, using brackets, strapping, welding etc., whereby an increased structural stability as well as safety are obtained. The ships or barges deck may have welded-on means, where hooks from straps or chains may be attached. Also, the deck may be provided with means similar to attachment mean on trucks for standard containers. Hence, the same attachment method may be used both for attaching the support frames to the deck as well as to other support frames.

The method may further involve, that any number of root support frames, spanwise support frames as well as blades are arranged to facilitate a plurality of blades to be stacked on top of each other adjacent to a number of already stacked blades and support frames. As the legs on the support frames are located on transverse sides of the blade, a further stacking of blades may be provides right next to an already present stacking of blades. As an alternative, two or more adjacent stackings may be provided before further blades are stacked vertically. Also, it is an option to mix the stacking orders. These actions may done to form a complete stack first and the further complete stacks of blades or forming all stacks one level at a time, or a mix between these actions.

The method may preferably include, that sideways adjacent root support frames are interconnected by attachments. The attachments may be provided by bolting, using brackets, strapping, welding etc., whereby an increased structural stability as well as safety are obtained of the overall stacking of blades in a plurality of stackings.

The method may involve that, at least two blades are stacked alternating on top of each other, such that a tip end of a lower blade is located adjacent to a root end of an upper, adjacent blade.

The method may also involve, that at least two blades are stacked on top of each other, such that a tip end of a lower blade is located adjacent to a tip end of an upper, adjacent blade. This may be an advantage, if and when the blades are handled with blade handling equipment suited for engaging the blades from one particular side.

The method may further involve, that at least two further blades are stacked on top of each other as well as on top of at least two stacked blades, such that a tip end of a lower blade of the two further blades is located adjacent to a tip end of an upper, adjacent blade, and wherein the tip end of the lower blade of the further two further blades is located at adjacent to a root end of a lower blade. This may provide a more compact stacking, when and if the blades are coned or pre-bent, as then two adjacent blade tips may come very close, which provides space for two root ends of at least two blades on top of said blade tips. And the tip ends fits closely and compact to the root ends of the at least two root ends of the at least two blades located underneath. Most wind turbines have two or three blades. This means, that the engagement may be done from a same side for one turbine. As the ship or barge carrying the blades move to the next turbine for installation of a next set of blades, the ship or barge may be turned half way round so that the next set of blades are located suitably for the handling equipment.

Further involved in the method, the attachment part of the root support frame may be pivotable about a horizontal axis, which horizontal axis is transverse to a longitudinal, spanwise direction of the blade. The ability to pivot provide a preferred way of arranging the blades in any configuration, as the support frames may be manufactured alike and not to any specific stacking angle of the blade. Also, by allowing the blades to pivot, compared to keeping the blade horizontal, facilitates a higher number of blades to be stacked in stacks, which are lower. When a lower blade is pivoted downwards, the tip end of the blade will be lower. This means that an oppositely pointing next upper blade may be placed with its root end lower as the lower blades tip end is lower etc.

The method may also include, that the cradle-like support part is pivotable about a horizontal axis, which horizontal axis is transverse to a longitudinal, spanwise direction of the blade. This provides the opportunity to connect to a spanwise portion of the blade independently of the angle of said portion of the blade.

The method may involve, that sideways adjacent root support frames may also be mutually attached, which secures the stacked blades even further.

A further or alternative aspect may involve that the blades are pre-bent. A pre-bent blade is a blade, where the blade, when mounted on a wind turbine, has a curvature in a direction facing the wind. The effect is, that a higher blade tip to tower distance is obtained. Such blades may also be transported and stacked according to the aforementioned methods and support frames. The curvature may be chosen in a way, where the blade tip end, when seen in a longitudinal direction of the blade, is within a diameter of the blade root end. The curvature may be also be chosen in a way, where the blade tip end, when seen in a longitudinal direction of the blade, is outside a diameter of the blade root end. When the tip end is within a diameter of the root end, this may have a minimum impact on stacking of blades. I.e. the stacking sequence may be freely chosen. When the tip end is outside a diameter of the blade root end, this may cause restraints on the stacking sequence to obtain a compact stacking. This may involve, that two or three blades in a sequence is stacked with the tip ends facing a same direction and following blades in the stacking sequence is facing in an opposite direction.

BRIEF DESCRIPTION OF THE FIGURES

Aspects according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1:
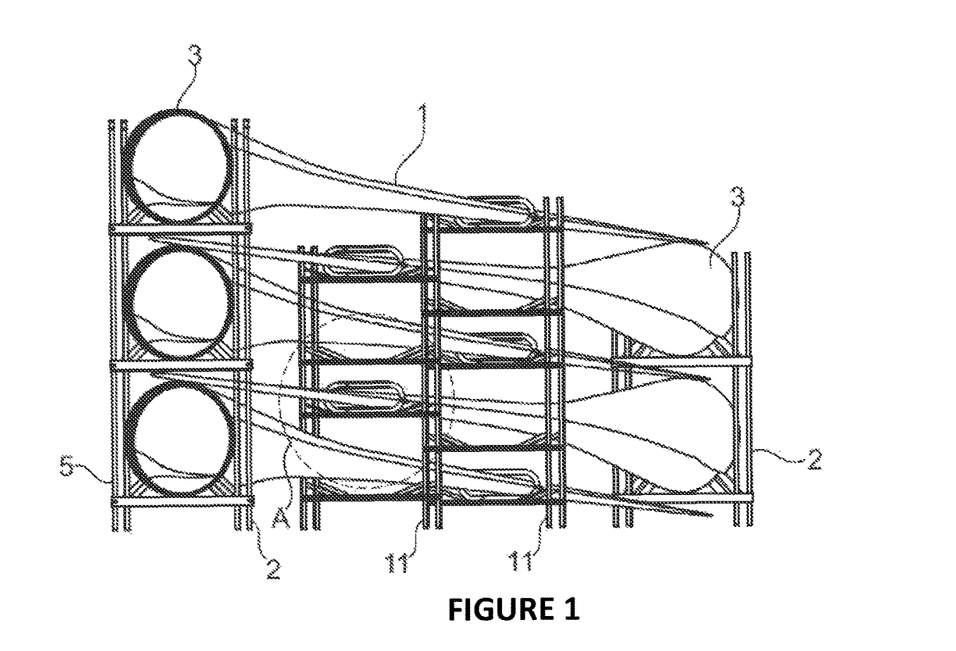
FIG. 1 is a perspective view of a number of blades stacked on top of each other.

FIG. 1 shows stacked blades. In this configuration, it is chosen not only have the legs 5 point downwards, but also upwards. The latter means that the upwards pointing legs may provide support for an upper blade 1. The legs 5 of one root support frame 2 by the root ends 3 are connected to the legs 5 of the upper support frame for the upper blade. The connection may be a bolt connection or a twist and lock connections as known for standard 20 and 40 foot shipment containers. The spanwise support frames 11 are also provided with legs pointing down as well as up. Again, this is to provide support for a spanwise support frame of an upper blade. As the spanwise support frames are not placed by the half length of the blades, the will be a distance between the spanwise support frames for each layer in the stack. This is solved by adapting the lengths of the upwards legs 5 according the actual blades location in the stack. The legs 5 of one spanwise support frame 11 are connected to the legs 5 of the upper support frame for the upper blade. The connection may be a bolt connection or a twist and lock connections as known for standard 20 and 40 foot shipment containers.

Figure 2:
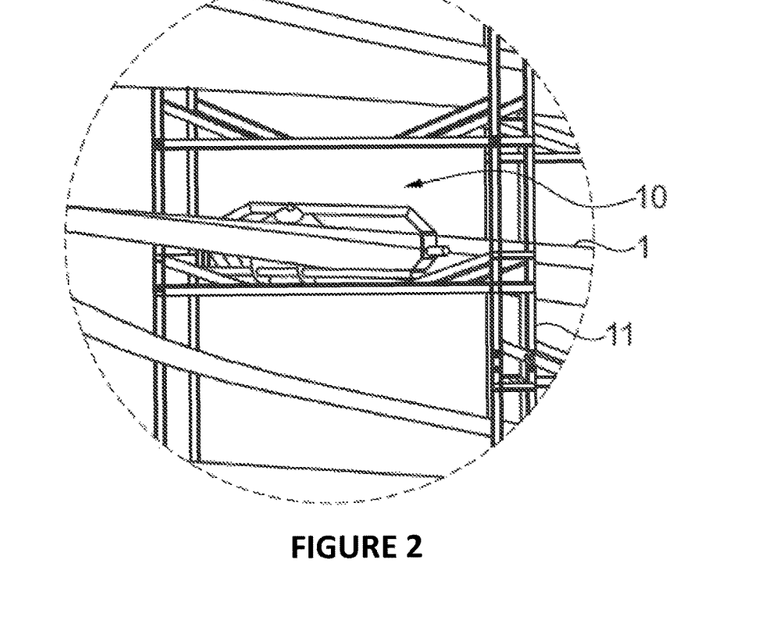
FIG. 2 is an enlargement of view A of FIG. 1.

In FIG. 2 it is shown how the spanwise section of the blade 1 is supported by a cradle-like support 10, which is a part of the spanwise support 11.

The support structures 2 and 11 may hereby be used for transport at a manufacturing site, away for road or train transport as well as be used as a stacking system without further framework. This is a great ease as reloading of the blades is greatly reduced, but also provide significant savings in equipment for handling, transporting and stacking.

Figure 3:
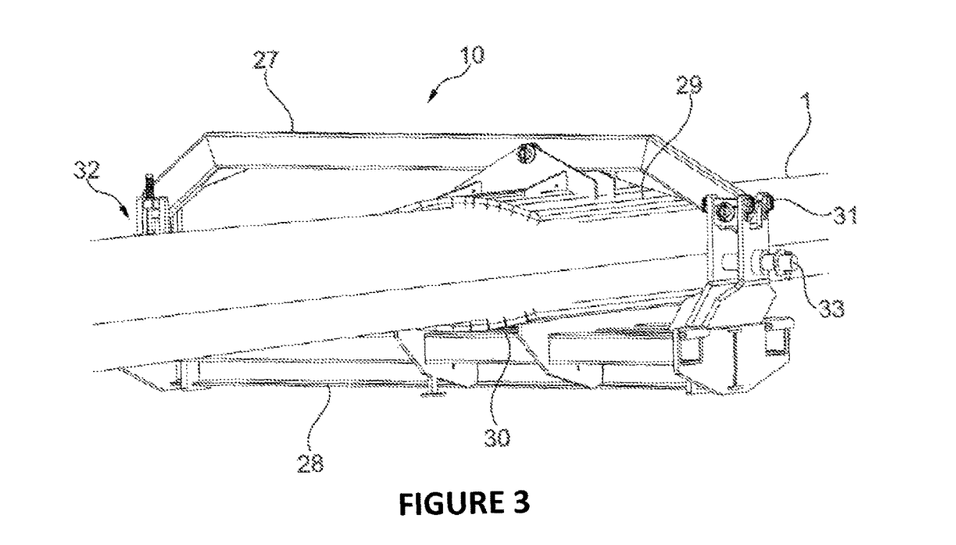
FIG. 3 is a perspective view of a cradle-like support part holding a blade.

FIG. 3 shows a cradle-like support 10 attached to a blade 1. The cradle-like support includes an upper arm 27 having a pivotable upper support plate 29 and a lower arm 28 having a pivotable support plate 30. The support plates 28, 30 conform to the contour of the spanwise section of the blade 1. The upper and lower arms, 27, 28 are connected by a hinge 31 and locked by a clamp 32. A shaft 33 is provided for pivotable connection to a remaining part of a spanwise support frame.

Figure 4:
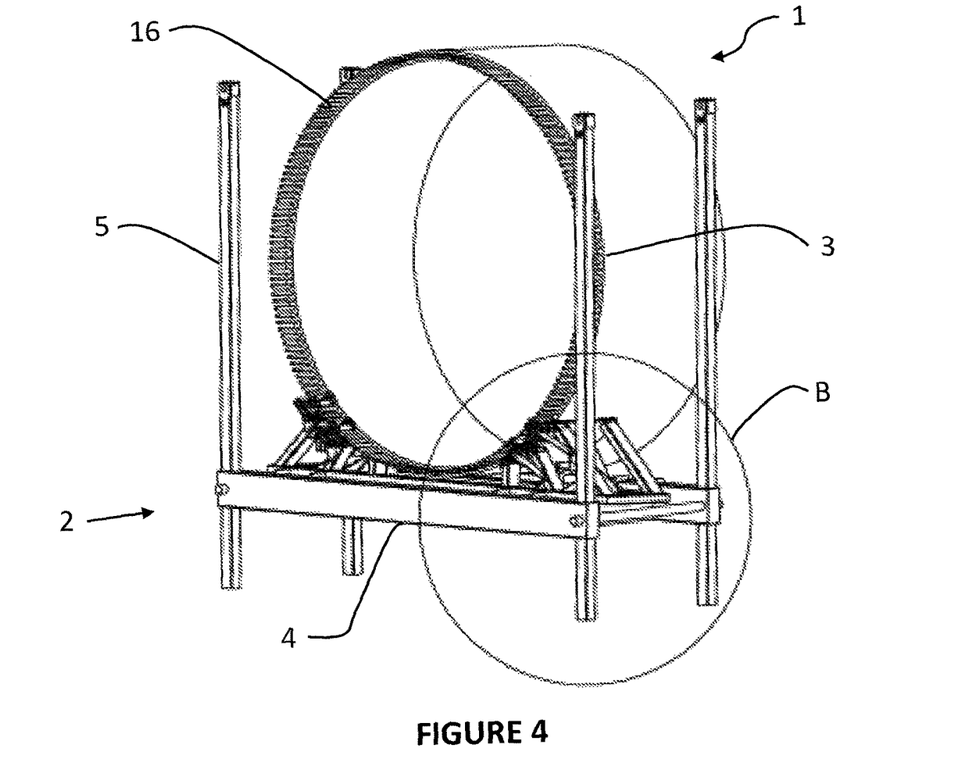
FIG. 4 is perspective view of a blade root fitted with a blade root support frame, FIG. 5 are sectional, perspective view section B of FIG. 4 of a blade root fitted with a blade root support frame.
Figure 5:
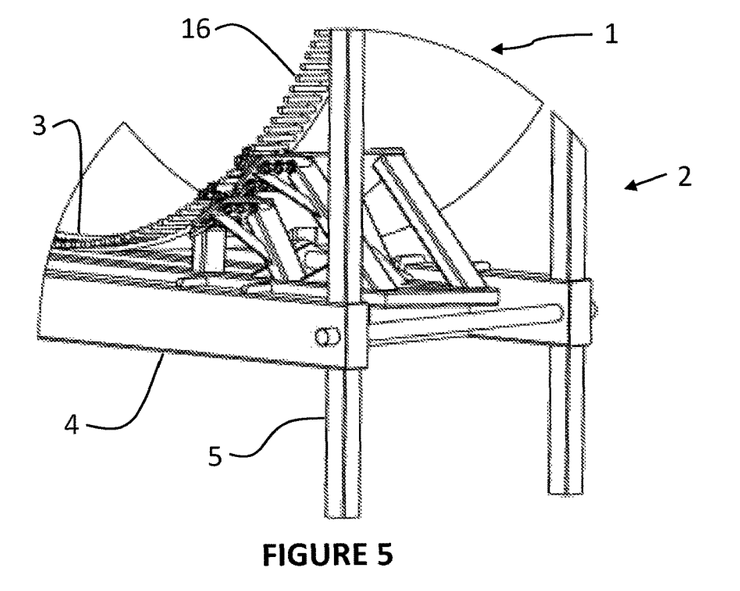

FIGS. 4 and 5 show a blade 1 root with a root flange 3 having inserted stud bolts 16. The stud bolts are used for connecting the blade to a not shown wind turbine hub. A root support frame 2 including a main support part 4 is connected to the blade 1 using the flange 3 and the stud bolts 16. The main support part 4 is supported by legs 5. The legs 5 are here shown as non-movable, but may, not shown, be configured to be movable, e.g. telescopic or pivotable, between at least a support position, a transport position and a lifting position as well as vice versa, and where movement of the legs is performed manually or using a power source.

Figure 6:
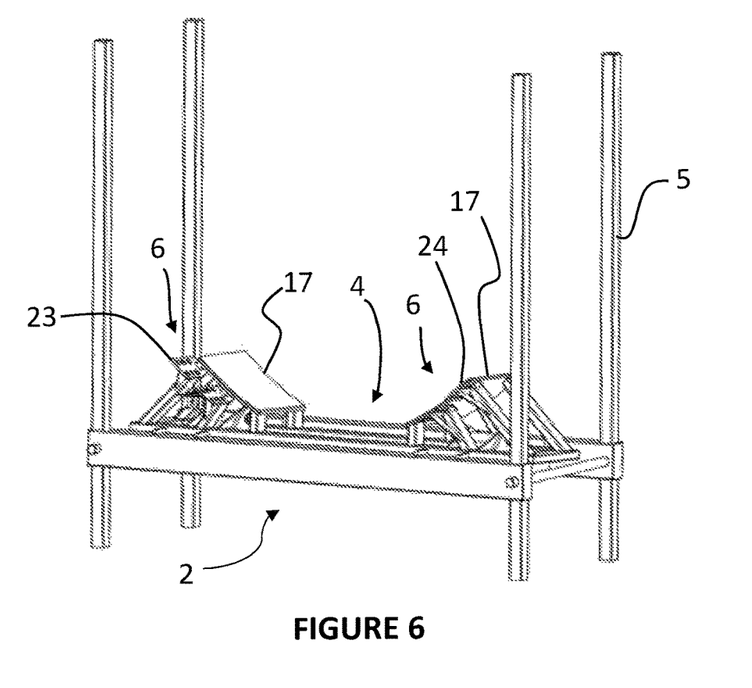
FIG. 6 is a perspective view of a blade root support frame.

FIG. 6 shows blade root support frame 2. The root support frame includes a main support frame 4 supported by legs 5 as well as attachment parts 6 for attachment to a blade root. The attachment part 6 includes attachment means 23, which here are shown as tubular structures 24 for receiving stud bolts from a blade root. When the stud bolts are received by the tubular structures, they are fixated with not shown bolt nuts. In order to decrease the load from the blade root flange and the stud bolts, the blade root may rest on support plates 17, which adapted to conform to the blade contour.

Figure 7:
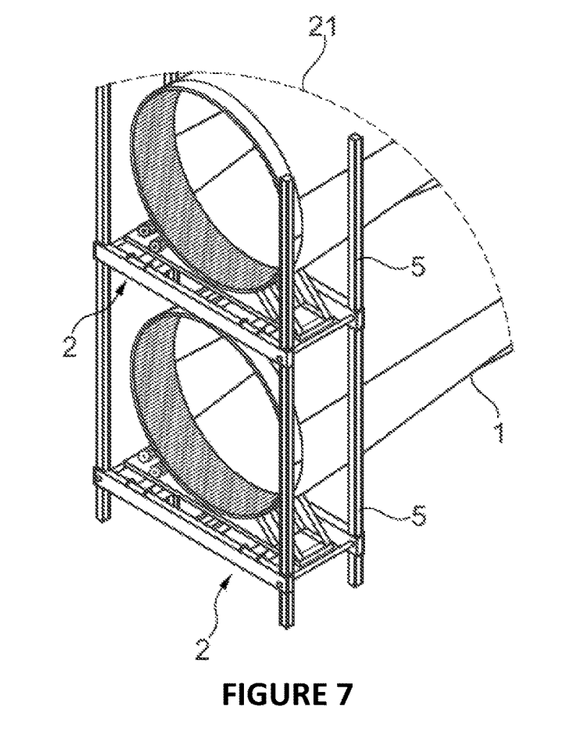
FIG. 7 is a partial, perspective view of stacked blades.

FIG. 7 shows two stacked blades, a lower blade 1 and an upper blade 21. The blades are stacked using root end support frames 2 having legs 5 with a length adapted to suit the diameter of the blade root end.

Figure 8:
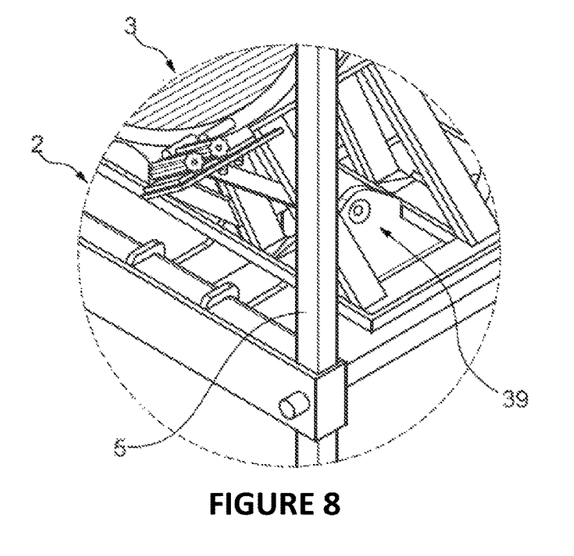
FIG. 8 is a partial and enlarged perspective view of the root frame of a stacked blade.

FIG. 8 is a detailed and enlarged view of a root support connection 2, which is support a root end 3. The upward part of a leg 5 is shown. The root support frame 2 may have a hinge 39, so the entire blade may pivot at the blade root.

Figure 9:
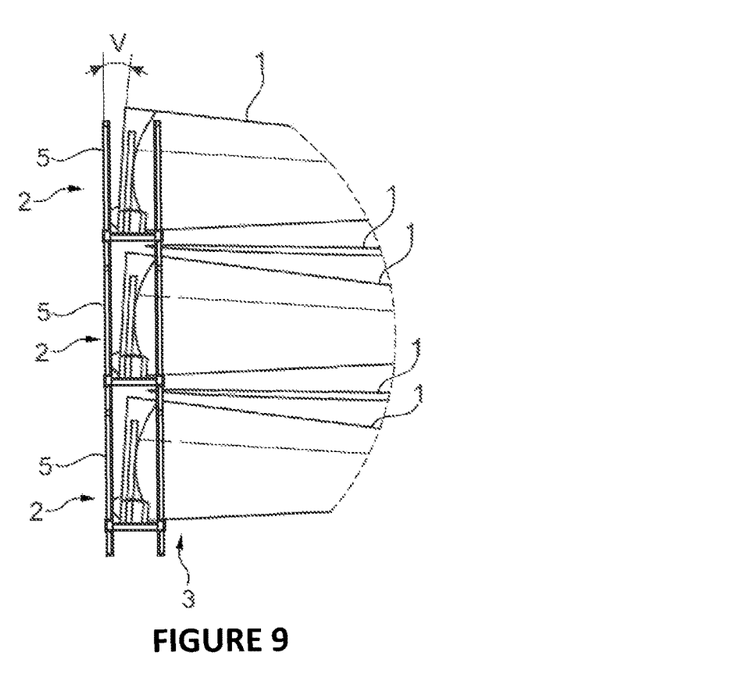
FIG. 9 is a partial side view of stacked blades at the blade root ends.

FIG. 9 shows five stacked blades 1 each having a root support frame 2 at the root end 3. Legs 5 of the root support frames 2 provide the framework for stacking the blades. As can be seen from the angle V, the blades 1 are pivoted slightly. A closer stacking is hereby obtained compared to stacking the blades in a purely horizontal manner. The lowered tip of a lower blade gives space to place the root end of a next upper blade lower and so on. This reduces the height of a stack of a given number of stacked blades.

Figure 10:
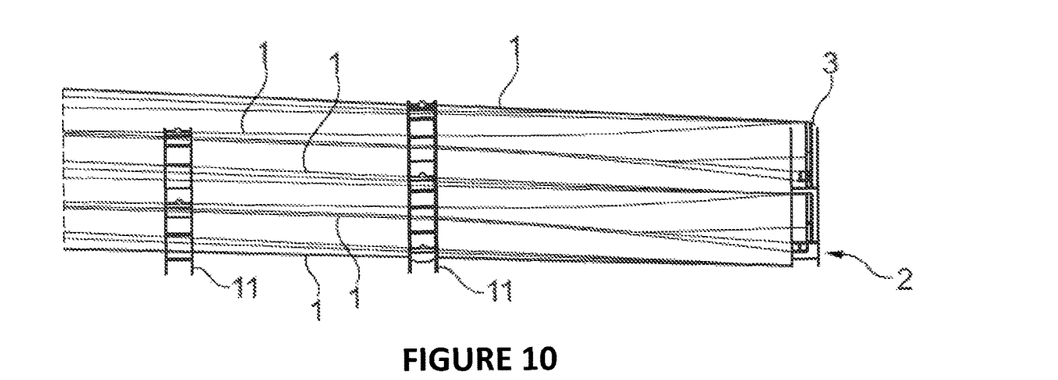
FIG. 10 is a sectional view of stacked blades.

FIG. 10 shows five stacked blades 1 seen from the side. Spanwise supporting frames 11 support the blade as well as root support frames 2 located at the blade roots 3.

Figure 11:
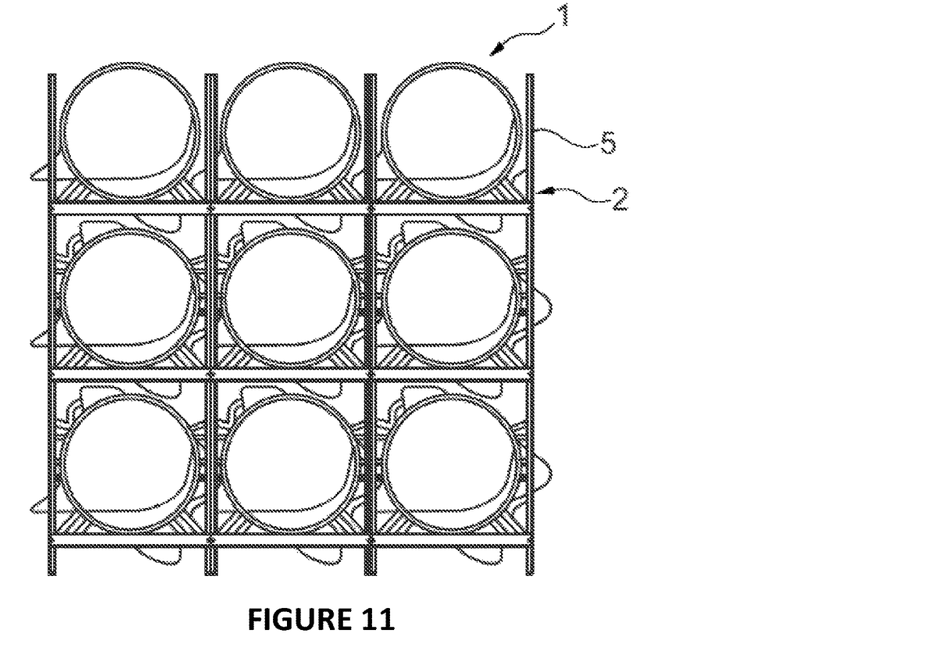
FIGS. 11 and 12 are opposite end views of stacked blades.
Figure 12:
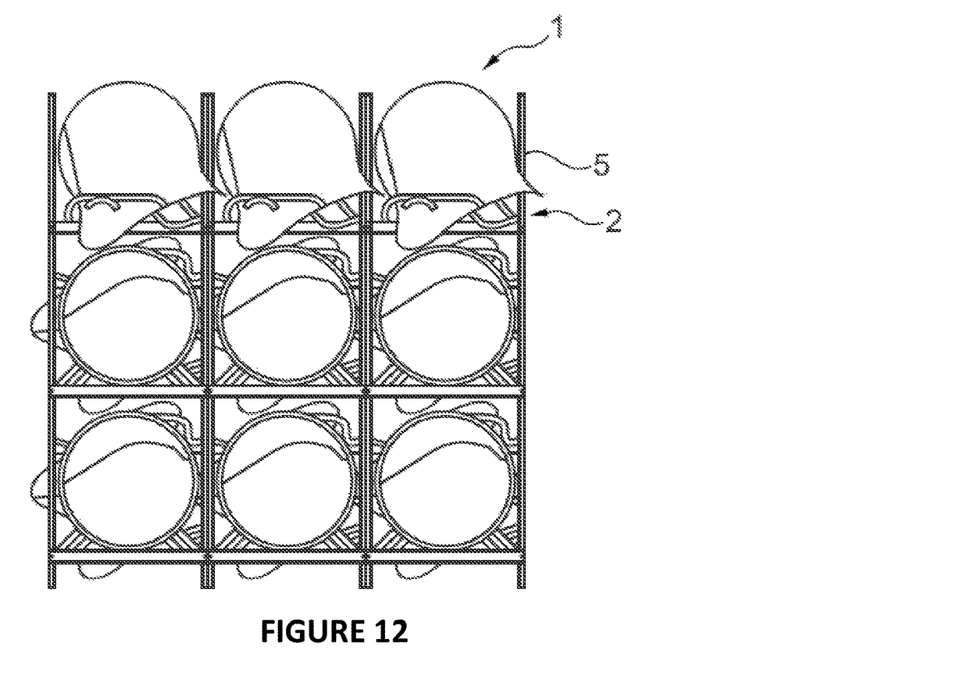

FIGS. 11 and 12 show three adjacent stacks of blades 1. The blades are stacked in vertical direction as alternating tip end pointing to a root end of and underlying blade, respectively. The supports 2 and legs 5 form part of a substantially complete stacking structure for sea transport. Fifteen blades are stacked in total in the three stacks. However, additional adjacent stacks could be positioned by the shown stacking as well as further blades in the height.

Figure 13:
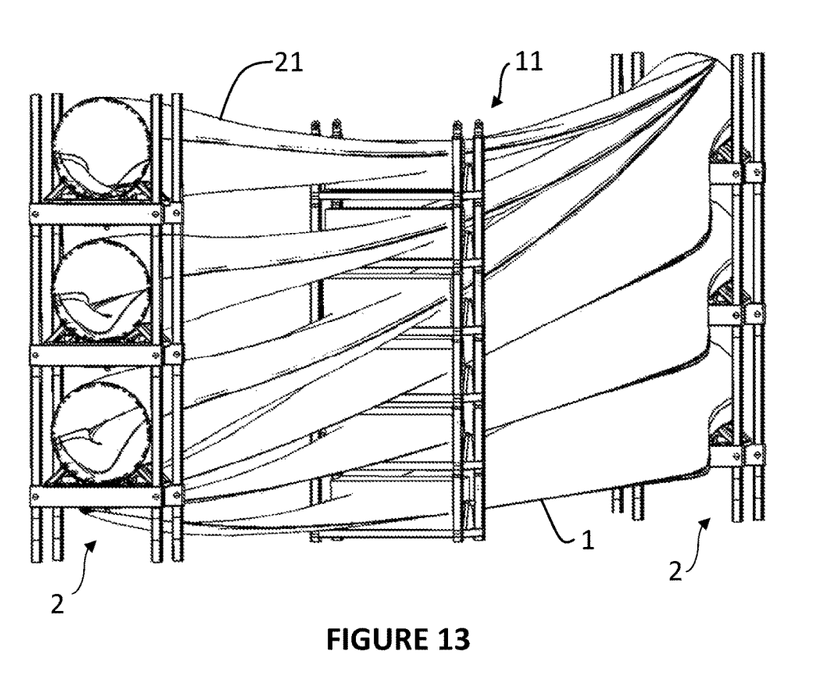
FIG. 13 shows stacked pre-bent blades.

FIG. 13 shows three stacked lower pre-bent blades 1 facing a same direction and three upper blades 11 on top of the lower blades 1 and all facing a same direction opposite to the lower blades. The blades 1, 21 are supported by root supports 2 and spanwise supports 22.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of stacking wind turbine generator blades for sea transportation, the method comprising:
    attaching a blade root support frame to a root flange of the blade, where
    the root support frame includes a main support part, which is supported by at least two legs located as at least one leg on each transverse side of a root end of the blade, and
    an attachment part adapted for being attached to the root flange of the blade, and
    attaching a blade spanwise support frame to a spanwise portion of the blade, where
    the spanwise support frame includes a cradle-like support part adapted to engage and support a spanwise surface part of the blade, and
    where the spanwise support frame is supported by at least two legs located as at least one leg on each transverse side of the blade,
    where the legs of the root support frame and the spanwise support frame extend both downwards and upwards and are adapted to have lengths downwards and upwards in order that at least two blades are stackable on top of each other,
    wherein a stacking support structure for the blades consists of mainly the support frames, when the at least two blades are transported at sea, and
    wherein the attachment part of the root support frame is pivotable about a horizontal axis, which horizontal axis is transverse to a longitudinal, spanwise direction of the blade.

2. The method according to claim 1, wherein at least two root support frames, spanwise support frames as well as blades are provided to facilitate a plurality of blades to be stacked on top of each other.

3. The method according to claim 1, wherein the root support frames and spanwise support frames are attached to a vertically adjacent root support frame and spanwise support frame, respectively.

4. The method according to claim 1, wherein the method comprises that at least two root support frames, spanwise support frames as well as blades are arranged to facilitate a plurality of blades to be stacked on top of each other adjacent to a number of already stacked blades and support frames.

5. The method according to claim 4, wherein sideways adjacent root support frames are interconnected by attachments.

6. The method according to claim 1, wherein at least two blades are stacked alternating on top of each other, such that a tip end of a lower blade is located adjacent to a root end of an upper, adjacent blade.

7. The method according to claim 1, wherein at least two blades are stacked on top of each other, such that a tip end of a lower blade is located adjacent to a tip end of an upper, adjacent blade.

8. The method according to claim 7, wherein at least two further blades are stacked on top of each other as well as on top of at least two stacked blades, such that a tip end of a lower blade of the two further blades is located adjacent to a tip end of an upper, adjacent blade, and wherein the tip end of the lower blade of the further two further blades is located at adjacent to a root end of a lower blade.

9. The method according to claim 1, wherein the cradle-like support part is pivotable about a horizontal axis, which horizontal axis is transverse to a longitudinal, spanwise direction of the blade.

10. The method according to claim 1, wherein the method comprises stacking of pre-bent blades.

* * * * *